(12) United States Patent
Chen et al.

(10) Patent No.: US 8,508,886 B2
(45) Date of Patent: Aug. 13, 2013

(54) USE OF MAGNETIC MATERIAL FOR RIE STOP LAYER DURING DAMASCENE MAIN POLE FORMATION

(75) Inventors: Yingjian Chen, Fremont, CA (US); Shiwen Huang, Fremont, CA (US); Edward Hin Pong Lee, San Jose, CA (US); Mun Hyoun Park, San Jose, CA (US); Kyusik Shin, Pleasanton, CA (US); Yuming Zhou, Lakeville, MN (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/247,883

(22) Filed: Sep. 28, 2011

(65) Prior Publication Data
US 2013/0078483 A1 Mar. 28, 2013

(51) Int. Cl.
*G11B 5/31* (2006.01)
(52) U.S. Cl.
USPC ....................................................... 360/125.3
(58) Field of Classification Search
USPC ....................................................... 360/125.3
See application file for complete search history.

(56) References Cited

U.S. PATENT DOCUMENTS

| 7,440,740 | B2 | | 10/2008 | Mogensen | |
|---|---|---|---|---|---|
| 7,633,714 | B2 | * | 12/2009 | Sasaki et al. | 360/125.3 |
| 7,768,743 | B2 | * | 8/2010 | Guthrie et al. | 360/125.13 |
| 7,843,665 | B2 | * | 11/2010 | Sasaki et al. | 360/125.03 |
| 7,920,358 | B2 | * | 4/2011 | Jiang et al. | 360/125.17 |
| 7,995,307 | B2 | * | 8/2011 | Zheng | 360/125.13 |
| 8,189,295 | B2 | * | 5/2012 | Han et al. | 360/125.3 |
| 8,233,235 | B2 | * | 7/2012 | Chen et al. | 360/125.15 |
| 2008/0112081 | A1 | | 5/2008 | Matono | |
| 2008/0266710 | A1 | | 10/2008 | Kameda et al. | |
| 2008/0266724 | A1 | | 10/2008 | Yazawa et al. | |
| 2009/0091862 | A1 | | 4/2009 | Han et al. | |
| 2010/0084262 | A1 | | 4/2010 | Umehara et al. | |
| 2010/0112486 | A1 | | 5/2010 | Zhang et al. | |
| 2010/0163520 | A1 | | 7/2010 | Bonhote et al. | |
| 2010/0302680 | A1 | | 12/2010 | Hirata et al. | |
| 2011/0042349 | A1 | | 2/2011 | Zhou et al. | |
| 2011/0102936 | A1 | | 5/2011 | Sugiyama et al. | |

FOREIGN PATENT DOCUMENTS

JP 2009181615 A 8/2009

* cited by examiner

*Primary Examiner* — Mark Blouin
(74) *Attorney, Agent, or Firm* — Patterson & Sheridan, LLP

(57) ABSTRACT

A write head for use in a magnetic disk drive and methods of manufacturing the same. When a non-magnetic reactive ion etching (RIE) stop layer is used in a damascene main pole fabrication process, the leading edge shield and the side shield have a magnetic separation. By replacing a non-magnetic RIE stop layer with a magnetic RIE stop layer, no removal of the RIE stop layer around the main pole is necessary. Additionally, the leading edge shield and the side shield will magnetically join together without extra processing as there will be no magnetic separation between the leading edge shield and the side shield.

20 Claims, 5 Drawing Sheets

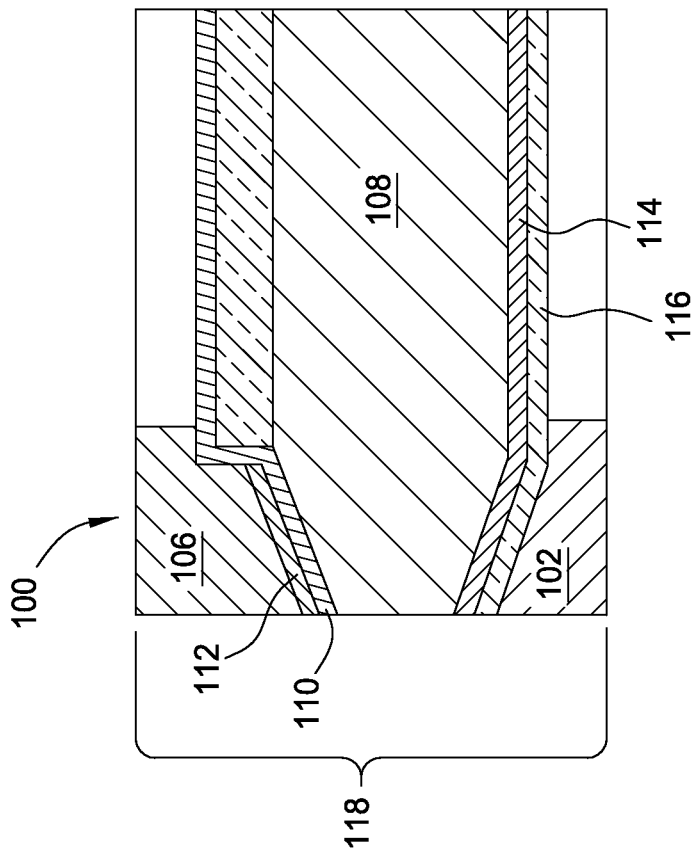
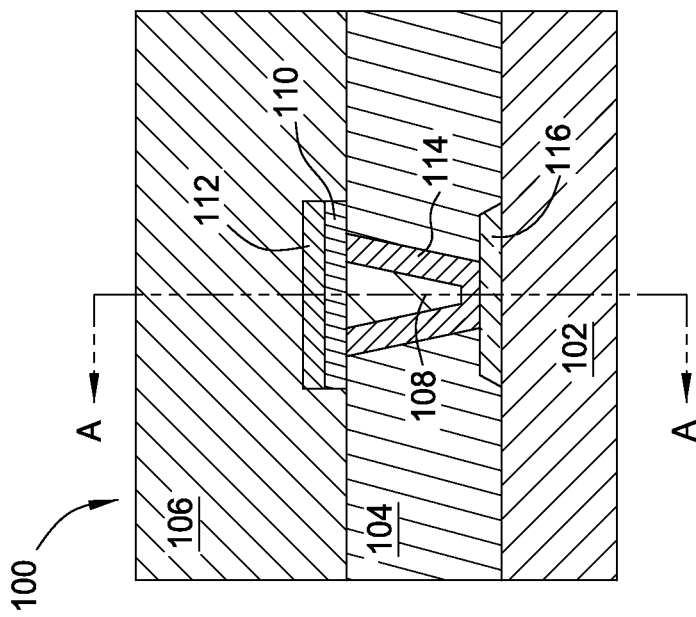
FIG. 1A
(PRIOR ART)
FIG. 1B
(PRIOR ART)

USE OF MAGNETIC MATERIAL FOR RIE STOP LAYER DURING DAMASCENE MAIN POLE FORMATION

BACKGROUND OF THE INVENTION

1. Field of the Invention

Embodiments of the present invention generally relate to methods of manufacturing a write head for use in a magnetic disk drive and for a write head thereby produced.

2. Description of the Related Art

A perpendicular recording system records data as magnetizations oriented perpendicular to the plane of the magnetic disk. The magnetic disk has a magnetically soft underlayer covered by a thin magnetically hard top layer. The perpendicular write head has a main pole, sometimes referred to as a write pole, with a very small cross section and a return pole having a much larger cross section.

FIGS. 1A and 1B are schematic illustrations of a prior art write head 100. FIG. 1A is a schematic illustration of the prior art write head 100 as viewed from the air bearing surface (ABS) 118 (shown in FIG. 1B). FIG. 1B is a schematic cross sectional view of the write head 100 of FIG. 1A as taken along line A-A. The write head 100 includes a leading edge shield 102, side shield 104 and trailing shield 106 which collectively surround the main pole 108. The main pole 108 is also surrounded by a write gap layer 110, a high Bs seed layer 112 and a side gap layer 114. As can be seen from FIG. 1B, the main pole 108 is tapered towards the ABS 118. A non-magnetic reactive ion etching (RIE) stop layer 116 is also present. The RIE stop layer 116 typically comprises a non-magnetic material such as chromium or nickel-chromium. The RIE stop layer 116 is utilized in the damascene process that is used to fabricate the main pole 108.

FIGS. 2A-2D are schematic views of a prior art write head 100 as viewed from the ABS 118 at various stages of manufacture. In order to fabricate the write head 100, an insulating layer 202 is formed over the leading edge shield 102. The insulating layer 202 is patterned by performing an RIE process to etch a trench 204 into the insulating layer 202 using a mask 206. The RIE stop layer 116 prevents etching into the leading edge shield 102. The mask 206 is removed and then the side gap layer 114 and main pole 108 are formed as shown in FIG. 2B. The insulating layer 202 is then removed as is as much of the RIE stop layer 116 as possible as shown in FIG. 2C. The side shield 104 is then deposited as shown in FIG. 2D.

Damascene write head main pole fabrication for ultra density beyond 700 gigabytes per square inch need the leading edge shield 102 and the side shield 104 to improve adjacent track interference (ATI) and far track interference (FTI) as well as the performance of the write head. The non-magnetic RIE stop layer 116 controls the trench 204 depth and the main pole 108 thickness. Because all of the RIE stop layer 116 cannot be removed, the non-magnetic RIE stop layer 116 causes a magnetic separation between the leading edge shield 102 and the side shield 104. The more RIE stop layer 116 that is removed, the more processing steps that are required. Additionally, removing additional RIE stop layer 116 material can ruin the shape of the main pole 108 and oftentimes causes redeposition of the nonmagnetic material on the sidewall of the main pole 108.

SUMMARY OF THE INVENTION

The present invention generally relates to methods of manufacturing a write head for use in a magnetic disk drive and for a write head thereby produced. When a non-magnetic RIE stop layer is used in a damascene main pole fabrication process, the leading edge shield and the side shield have a magnetic separation. By replacing a non-magnetic RIE stop layer with a magnetic RIE stop layer, no removal of the RIE stop layer around the main pole is necessary. Additionally, the leading edge shield and the side shield will magnetically join together without extra processing as there will be no magnetic separation between the leading edge shield and the side shield.

In one embodiment, a method of manufacturing a write head includes: depositing a magnetic reactive ion etching stop layer over a leading edge shield; depositing an insulating layer over the magnetic reactive ion etching stop layer; forming a mask over the insulating layer; and reactive ion etching exposed portions of the insulating layer to form a trench and expose at least a portion of the magnetic reactive ion etching stop layer.

In another embodiment, a method of manufacturing a write head includes: depositing a non-magnetic reactive ion etching stop layer over a leading edge shield; removing a portion of the non-magnetic reactive ion etching stop layer to expose a portion of the leading edge shield; depositing a magnetic reactive ion etching stop layer over the exposed portion of the leading edge shield; depositing an insulating layer over the magnetic reactive ion etching stop layer; forming a mask over the insulating layer; and reactive ion etching exposed portions of the insulating layer to expose at least a portion of the magnetic reactive ion etching stop layer and the non-magnetic reactive ion etching stop layer.

In another embodiment, a write head includes: a leading edge shield; a magnetic reactive ion etching stop layer disposed on the leading edge shield; a side shield disposed on the leading edge shield and the magnetic reactive ion etching stop layer; a side gap layer disposed on the side shield and the magnetic reactive ion etching stop layer; and a magnetic layer disposed on the side gap layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A is a schematic illustration of a prior art write head 100 as viewed from the ABS 118.

FIG. 1B is a schematic cross sectional view of the write head 100 of FIG. 1A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments are disclosed that generally relate to methods of manufacturing a write head for use in a magnetic disk drive and for a write head thereby produced. When a non-magnetic RIE stop layer is used in a damascene main pole fabrication process, the leading edge shield and the side shield have a magnetic separation. By replacing a non-magnetic RIE stop layer with a magnetic RIE stop layer, no removal of the RIE stop layer around the main pole is necessary. Additionally, the leading edge shield and the side shield will magnetically join together without extra processing as there will be no magnetic separation between the leading edge shield and the side shield. Thus, embodiments are disclosed which preserve a desired shape of the main pole and avoid or mitigate magnetic separation between the leading edge shield and the side shield.

Figure 2A:
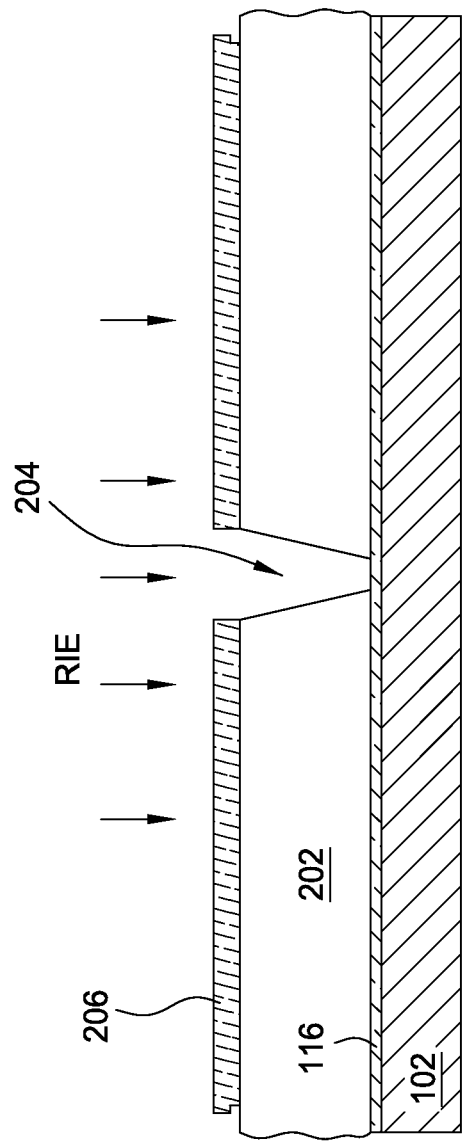
FIGS. 2A-2D are schematic views of the write head 100 from FIGS. 1A and 1B as viewed from the ABS 118 at various stages of manufacture.
Figure 2B:
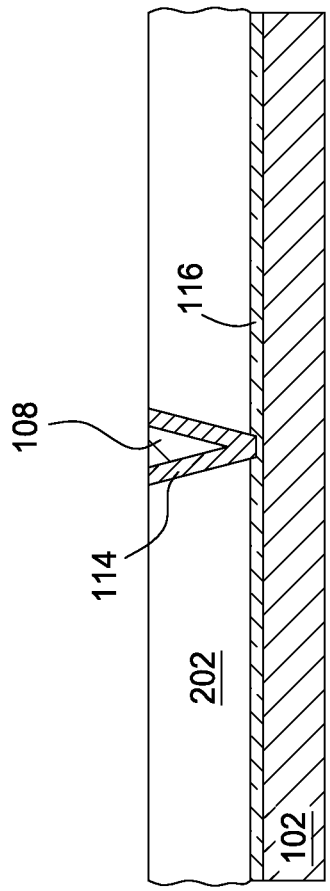
Figure 2C:
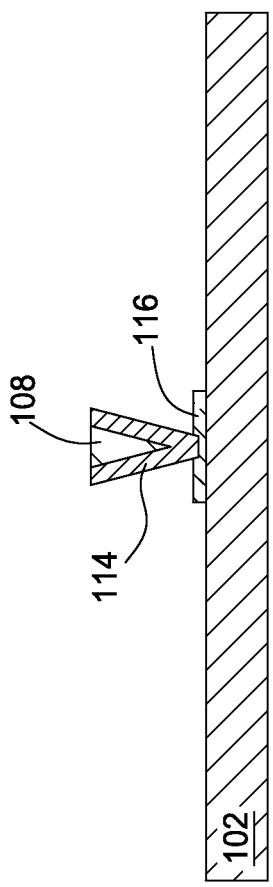
Figure 2D:
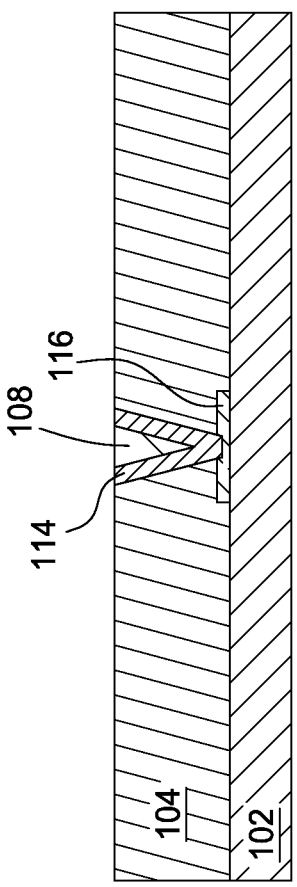
Figures 3A, 3B:
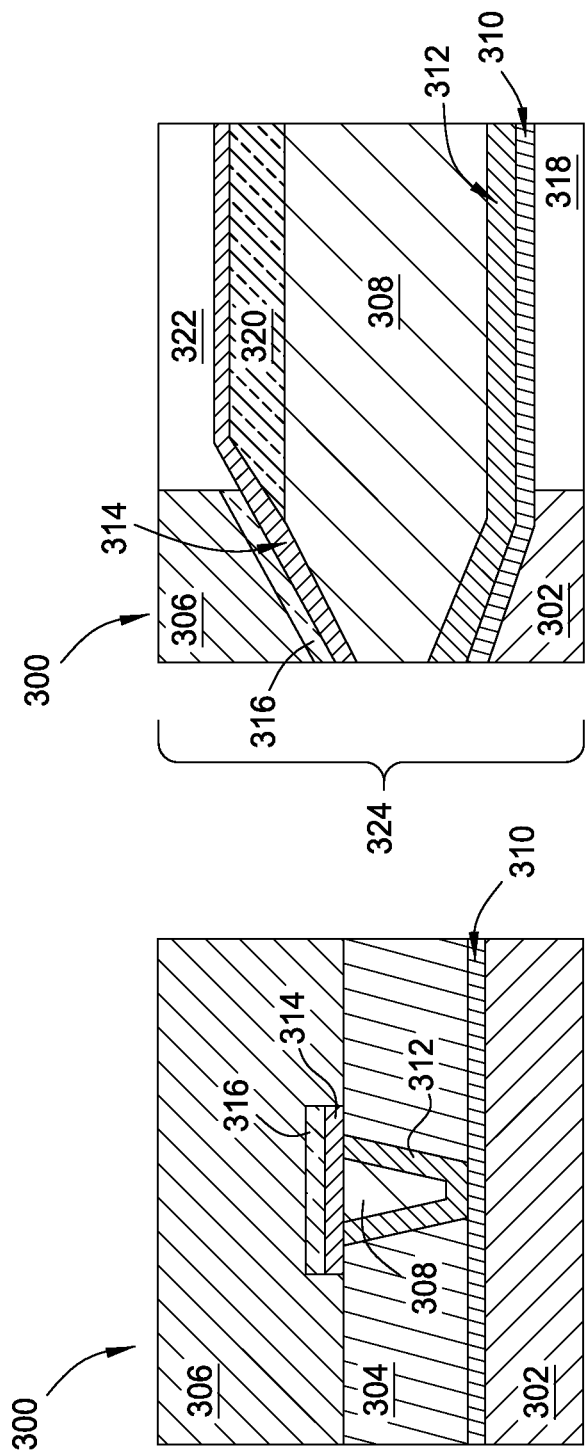
FIG. 3A is a schematic illustration of a write head 300 as viewed from the ABS 324 according to one embodiment.
FIG. 3B is a schematic cross sectional view of the write head 300 of FIG. 3A.

FIGS. 3A and 3B are schematic illustrations of a write head 300. FIG. 3A is a schematic illustration of the write head 300 as viewed from the ABS 324 (shown in FIG. 3B) according to one embodiment. FIG. 3B is a schematic cross sectional view of the write head 300 of FIG. 3A. The write head 300 comprises a leading edge shield 302 formed adjacent an insulating layer 318. Suitable materials that may be utilized for the leading edge shield 302 include ferromagnetic materials such as nickel, cobalt, iron, and combinations thereof such as $NiFe_{20}$. An example of an insulating material that may be utilized for the insulating layer 318 is alumina.

A magnetic RIE stop layer 310 is then formed over both the leading edge shield 302 as well as the insulating layer 318. The RIE stop layer 310 may have a thickness of between about 20 nm and about 40 nm, such as between about 30 nm and about 40 nm. The magnetic RIE stop layer 310 preferably comprises a nickel-iron alloy, such as $NiFe_{20}$, and can be deposited by a method such as sputtering. In one embodiment, the magnetic RIE stop layer 310 and the leading edge shield 302 have different compositions. The magnetic RIE stop layer 310 improves RIE resistance or alumina wet etch resistance.

Over the magnetic RIE stop layer 310, the side shield 304 and the main pole 308 are fabricated as discussed above with reference to the damascene process shown in FIGS. 2A-2D. Within the damascene trench, the side gap layer 312 is deposited as is the main pole 308. However, once the insulating material used for the damascene process is removed, the magnetic RIE stop layer 310 remains. The side gap layer 312 may comprise a material such as ruthenium and may be deposited to a thickness of between about 50 nm and about 100 nm. Over the main pole 308, a cap 320 is formed. Suitable materials that may be utilized for the cap 320 include tantalum, ruthenium, silicon carbide, combinations thereof, and multi-layer stacks such as tantalum/ruthenium/tantalum. The cap 320 may be deposited by sputtering.

The write gap layer 314 is formed over the main pole 308 and the cap 320. The write gap layer 314 is angled by ion milling. The write gap layer 314 may comprise a non-magnetic material such as alumina or nickel-chromium. As can be seen from FIG. 3B, the main pole 308 is tapered. Over the write gap layer 314, the high Bs seed layer 316 is deposited. The high Bs seed layer 316 comprises a high magnetic moment material such as a material having a magnetic flux density of between about 2.0 Tesla and about 2.4 Tesla such as CoNiFe. Over the high Bs seed layer 316 and the write gap layer 314, the trailing edge shield 306 and an insulating layer 322 are deposited. The trailing edge shield 306 may have a magnetic flux density of between about 1.5 Tesla and about 2.4 Tesla and may comprise a ferromagnetic material such as CoNiFe or $NiFe_{55}$. The insulating layer 322 may comprise alumina or other insulating material.

Figures 4A, 4B:
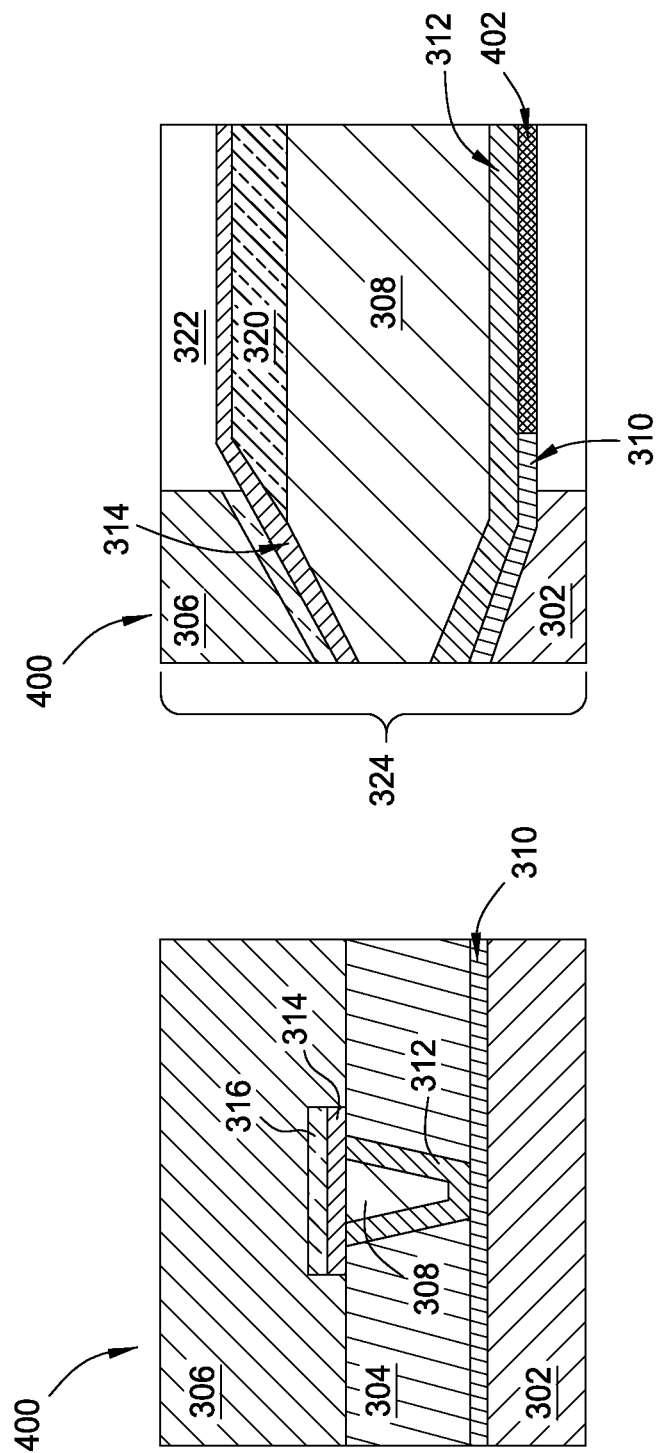
FIG. 4A is a schematic illustration of a write head 400 as viewed from the ABS 324 according to another embodiment.
FIG. 4B is a schematic cross sectional view of the write head 400 of FIG. 4A.

FIG. 4A is a schematic illustration of a write head 400 as viewed from the ABS 324 according to another embodiment. FIG. 4B is a schematic cross sectional view of the write head 400 of FIG. 4A. Rather than having the magnetic RIE stop layer 310 cover the entire insulating layer 318, a portion of the magnetic RIE stop layer 310 is removed and a non-magnetic RIE stop layer 402 is deposited over the insulating layer 318. Suitable materials that may be used for the non-magnetic RIE stop layer 402 include ruthenium, chromium and nickel-chromium. The non-magnetic RIE stop layer 402 will minimize any flux shunting between the main pole 308 and the leading edge shield 302 through the magnetic RIE stop layer 310. The non-magnetic RIE stop layer 402 will have a thickness of between about 20 nm and about 40 nm, such as between about 30 nm and about 40 nm. The remaining magnetic RIE stop layer 310 may have a length of between about 100 nm and about 2 microns, such as between about 100 nm and about 400 nm, as measured from the ABS 324. In one embodiment, the magnetic RIE stop layer 310 is deposited and patterned followed by deposition of the non-magnetic RIE stop layer 402. In another embodiment, the non-magnetic RIE stop layer 402 is deposited and patterned prior to deposition of the magnetic RIE stop layer 310.

By replacing the non-magnetic RIE stop layer in a write head at least partially with a magnetic RIE stop layer, there is no magnetic separation between the leading edge shield and the side shield. Additionally, the magnetic RIE stop layer may remain in place without the need to remove the magnetic RIE stop layer following the damascene process. Thus, processing costs are reduced as compared with write heads that utilize non-magnetic RIE stop layers. Because the magnetic RIE stop layer remains, the shape of the main pole is not compromised by an RIE stop layer removal process.

While the foregoing is directed to embodiments of the present invention, other and further embodiments of the invention may be devised without departing from the basic scope thereof, and the scope thereof is determined by the claims that follow.

What is claimed is:
1. A write head, comprising:
a leading edge shield;
a magnetic reactive ion etching stop layer disposed on the leading edge shield;

a side shield disposed on the magnetic reactive ion etching stop layer;

a side gap layer disposed on the magnetic reactive ion etching stop layer; and a magnetic layer disposed on the side gap layer.

2. The write head of claim 1, further comprising a non-magnetic reactive ion etching stop layer disposed adjacent the magnetic reactive ion etching stop layer.

3. The write head of claim 2, wherein the magnetic reactive ion etching stop layer comprises NiFe.

4. The write head of claim 3, wherein the magnetic reactive ion etching stop layer has a thickness between about 20 nm and about 40 nm.

5. The write head of claim 4, wherein the non-magnetic reactive ion etching stop layer comprises ruthenium, chromium and nickel-chromium.

6. The write head of claim 2, wherein the non-magnetic reactive ion etching stop layer comprises a material selected from the group consisting of chromium, nickel-chromium, ruthenium, and combinations thereof.

7. The write head of claim 6, wherein the leading edge shield comprises nickel, cobalt, iron, and combinations.

8. The write head of claim 1, wherein the magnetic reactive ion etching stop layer comprises NiFe.

9. The write head of claim 8, wherein the magnetic reactive ion etching stop layer has a thickness between about 20 nm and about 40 nm.

10. The write head of claim 9, further comprising a non-magnetic reactive ion etching stop layer comprising ruthenium, chromium and nickel-chromium.

11. The write head of claim 10, wherein the leading edge shield and the magnetic reactive ion etching stop layer comprise magnetic materials having different compositions.

12. The write head of claim 11, wherein the leading edge shield comprises nickel, cobalt, iron, and combinations.

13. The write head of claim 1, wherein the magnetic reactive ion etching stop layer has a thickness between about 20 nm and about 40 nm.

14. The write head of claim 13, further comprising a non-magnetic reactive ion etching stop layer comprising ruthenium, chromium and nickel-chromium.

15. The write head of claim 14, wherein the leading edge shield and the magnetic reactive ion etching stop layer comprise magnetic materials having different compositions.

16. The write head of claim 15, wherein the leading edge shield comprises nickel, cobalt, iron, and combinations.

17. The write head of claim 1, further comprising a non-magnetic reactive ion etching stop layer comprising ruthenium, chromium and nickel-chromium.

18. The write head of claim 17, wherein the leading edge shield and the magnetic reactive ion etching stop layer comprise magnetic materials having different compositions.

19. The write head of claim 18, wherein the leading edge shield comprises nickel, cobalt, iron, and combinations.

20. The write head of claim 1, wherein the leading edge shield and the magnetic reactive ion etching stop layer comprise magnetic materials having different compositions.

* * * * *